United States Patent Office 3,469,162
Patented Sept. 23, 1969

3,469,162
MULTIPLEX-TYPE CONTROL APPARATUS
Geoffrey Walter Goslin, Welwyn, England, assignor to Hawker Siddeley Dynamics Limited, Hatfield, Hertfordshire, England, a company of Great Britain
Filed Apr. 1, 1966, Ser. No. 539,355
Claims priority, application Great Britain, Apr. 13, 1965, 15,723/65
Int. Cl. G05b 11/01, 23/02
U.S. Cl. 318—18                13 Claims

ABSTRACT OF THE DISCLOSURE

Multiplex type control apparatus which includes at least three lanes, each lane including a differential device supplied with an electrical input signal representing the magnitude of at least one variable quantity; the output of each differential device acts through an amplifier on an associated electro-mechanical converter, the electro-mechanical converters being connected in parallel to an averaging mechanism, the output of which controls the mechanism in accordance with the electrical input signal. A feedback for each lane is supplied both from the associated electro-mechanical converter and from the averaging device with the latter having the greatest effect.

---

Figure 1:
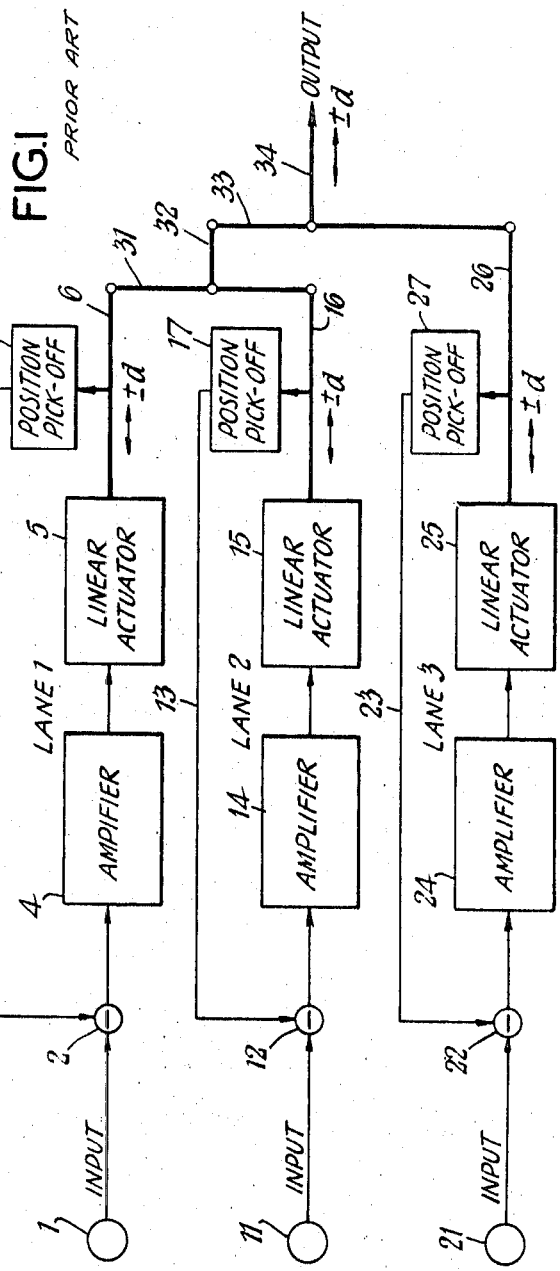

This invention is concerned with improvements in or relating to multiplex-type control apparatus.

According to the invention, there is provided multiplex-type control apparatus which includes at least three lanes each responsive to an electrical input signal representing the magnitude of at least one variable quantity, each lane including a separate differential device arranged to generate an electrical output signal which is equal to the electrical input signal for that lane minus a resultant electrical feedback signal for that lane, each lane including a separate electromechanical converter arranged to generate a mechanical output signal which is a function of the output signal of the differential device of that lane, the apparatus including an averaging mechanism arranged to generate a resultant mechanical output signal which is a function of the average of the mechanical output signals of the lanes, each lane including a separate position-sensitive device arranged to generate a first electrical feedback signal which is a function of the mechanical output signal of that lane, and the apparatus including position-sensitive means arranged to generate, for each lane, a second electrical feedback signal which is a function of the resultant mechanical output signal, the resultant electrical feedback signal for each lane being equal to the sum of the first and the second electrical feedback signals for that lane.

Preferably, each lane contains separate amplifying means arranged to amplify the output signal of the differential device of that lane and to supply the amplified signal to the electromechanical converter of that lane. In such case, preferably, the amplification of the corresponding amplifying means is relatively high, whereby, for each lane, the mechanical output signal is a substantially linear function of the electrical input signal to the differential device of that lane.

Preferably, the resultant mechanical output signal is equal to the average of the mechanical output signals of the lanes. Conveniently, in such case, if the change of each of the first feedback signals per unit change of the corresponding mechanical output signal is $x$ (e.g., in volts/cm.) and if the change of each of the second feedback signals per unit change of the resultant mechanical output signal is $y$ (e.g., in volts/cm.), then $x$ and $y$ are so chosen that $100x/(x+y)\%$ is not less than the maximum percentage difference $z$, due to working tolerances, which may occur between the amplitudes of the nominally identical electrical input signals to the differential devices of the lanes. The expression "working tolerances" refers here to acceptable differences between the amplitudes of the electrical input signals, during normal working of the apparatus. Preferably, $x$ and $y$ are so chosen that $100x/(x+y)$ is greater than, but is only a relatively small amount greater than $z$.

Preferably, for each lane, the normal range of variation of the corresponding mechanical output signal for a predetermined maximum range of the electrical input signal extends from $-d$ to $+d$ where $d$ is a constant, but the permissible range of variation of the mechanical output signal extends at least from $-md/(m-2)$ to $+md/(m-2)$, where $m$ is the number of lanes employed. Conveniently, there are three lanes, and the permissible range of variation of the mechanical output signal of each lane extends at least from $-3d$ to $+3d$.

The position-sensitive means may comprise a separate additional position-sensitive device for each lane.

Conveniently, the position-sensitive devices and the additional position-sensitive devices are all substantially identical, and each lane includes a separate signal-reducing means located between the corresponding position-sensitive device and the corresponding differential device; each signal-reducing means may comprise a potential divider.

Preferably, each lane includes a separate transducer responsive to the magnitude of the said variable quantity or quantities and arranged to generate the electrical input signal for that lane.

The invention also extends to a control system which includes multiplex-type control apparatus according to the invention.

Figure 2:
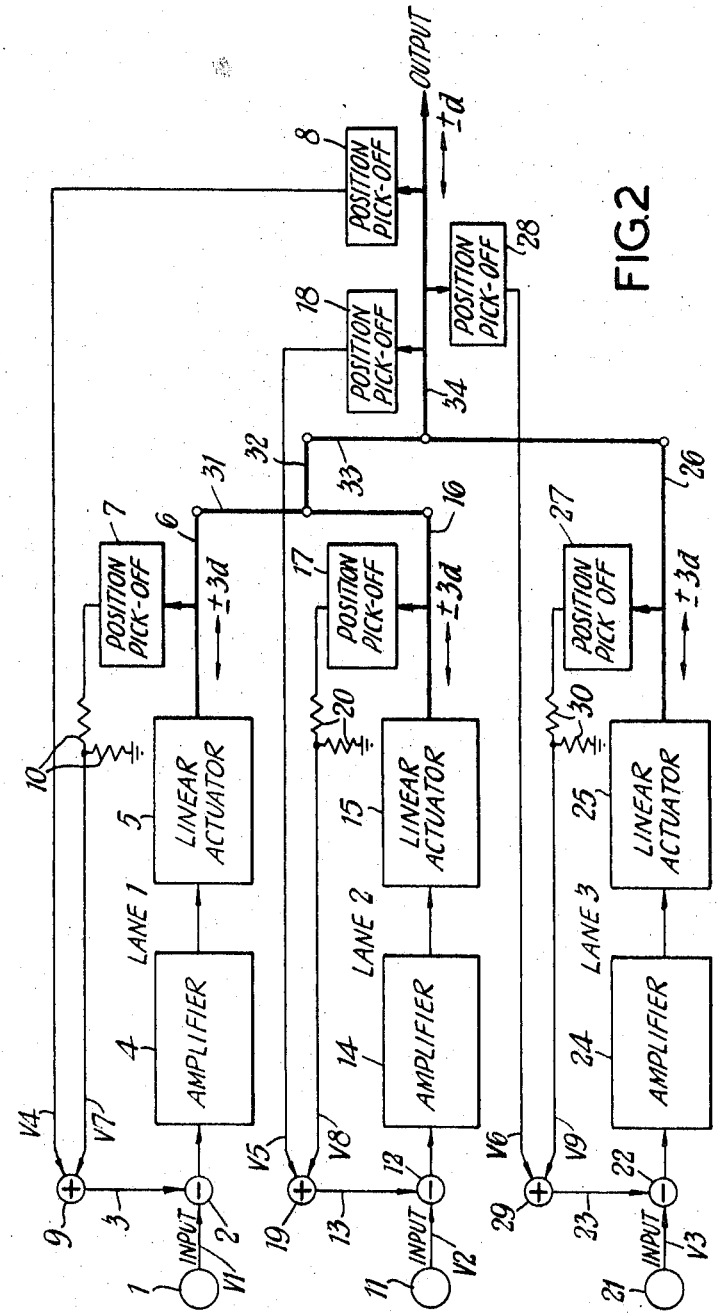

One specific embodiment of the invention will now be described with reference to the accompanying drawings, of which:

FIGURE 1 is a schematic diagram of a known form of multiplex-type control apparatus, and FIGURE 2 is similar to FIGURE 1, but shows an apparatus according to the invention.

Where a control apparatus performs a control function which it is important not to interrupt, it is known to duplicate or, in more general terms, "multiplicate," the control apparatus. In such a case, if the control apparatus develops a fault, then, firstly, the existence of the fault must be detected, whereafter the faulty control apparatus must be removed from the circuit and replaced by the duplicate control apparatus or by one of the duplicated sets of control apparatus, such transfer being carried out by the operation of suitable switching means. However, in certain cases, the delay involved in substituting the duplicate control apparatus for the faulty control apparatus cannot be tolerated; furthermore, when the transfer is attempted, its successful completion relies upon the correct operation of the associated switching means, so that the reliability (or "integrity") of the complete system depends upon the switching means, such reliance being often unacceptable. Examples of such cases are the failure of control apparatus employed for the automatic (blind) landing of aircraft, and the failure of control apparatus employed to control a "V.T.O.L." (vertical-take-off-and-landing) aircraft while that aircraft is hovering above the ground. In such cases, it is known to "multiplex" the control apparatus, i.e. to provide two or more sets of the control apparatus which are connected together in parallel and arranged to generate a resultant output signal which represents the average of the individual output signals of the sets of control apparatus, the arrangement being such that, if one set of control apparatus fails, then the remaining set or sets of control apparatus nevertheless tends to maintain a resultant output signal of the correct magnitude.

FIGURE 1 shows an example of a known multiplex-type control apparatus where three sets of control apparatus are connected in parallel in the way just mentioned, the apparatus being said to have three "lanes."

Referring to FIGURE 1, the first lane includes a transducer 1 which is responsive to the magnitude of at least one variable quantity, for example, the angle of roll of an aircraft, and which is arranged to generate an electrical input signal which is a function of the magnitude of that variable quantity or quantities.

The electrical input signal is supplied to a differential device 2 wherein an electrical feedback signal supplied over a feedback line 3 is subtracted from the electrical input signal (the feedback being thus negative feedback). The resulting electrical output signal of the differential device 2 is supplied, via an amplifier 4, to an electromechanical converter which may have the form of a linear actuator 5. The output of the linear actuator 5 is a mechanical output signal in the form of a linear displacement which is thus a function of the output signal of the differential device 2.

This linear displacement is communicated to an arm 6 which is arranged to control a position-sensitive device in the form of a pick-off 7 the output of which is a first electrical feedback signal which is a function of the linear displacement of the arm 6 and which is supplied to the feedback line 3 to constitute, in the case of FIGURE 1, the feedback signal referred to in the preceding paragraph.

The gain of the amplifier 4 is made sufficiently high to cause the linear movement of the arm 6 to be a substantially linear function of the electrical input signal to the differential device 2.

The second and third lanes of the control apparatus are identically arranged to the first lane and, in FIGURE 1, corresponding elements are therefore indicated by 1, 11, 21 and by 2, 12, 22 etc.

It will be understood that the transducers 1, 11 and 21 all respond substantially similarly to the same variable quantity or quantities.

The linear displacements of the arms 6, 16 and 26 are communicated to an averaging mechanism which is arranged to generate a resultant linear displacement which is equal to the average of the individual linear displacements of the arms 6, 16 and 26. The averaging mechanism is indicated schematically in FIGURE 1 as comprising two levers 31 and 33, and two arms 32 and 34. With the schematic arrangement shown, the lever 31 is pivoted at its opposite ends to the levers 6 and 16 respectively, and the arm 32 is pivoted to the centre of the lever 31 such that the resultant linear displacement of the arm 32 is the average of the linear displacements of the arms 6 and 16, i.e. if $(a)$ and $(b)$ are respectively the displacements of the arms 6 and 16, then the displacement of the arm 32 is given by $(a+b)/2$.

In the schematic arrangement, the lever 33 is pivoted at its opposite ends to the arms 32 and 26 respectively, and the arm 34 is pivoted to the lever 33 at a distance from the pivotal connection to the arm 32 equal to one-third of the length of the lever 33. In the result, the resultant linear displacement of the arm 34 will be the average of the individual linear displacements of the arms 6, 16 and 26, i.e. if $(a)$, $(b)$ and $(c)$ are respectively the displacements of the arms 6, 16 and 26, then the displacement of the arm 34 is given by $(a+b+c)/3$.

Suppose that the full range of linear displacement of each of the arms 6, 16, 26 and 34 is from $(-d)$ to $(+d)$, where $(d)$ is a constant, that full range corresponding to the full range of variation of the electrical input signals from the transducers 1, 11 and 21. If, now, one of the lanes (assumed to be the first lane) fails to operate correctly, the worst condition that can arise is that the output of the first lane (i.e., the linear position of the arm 6) remains (wrongly) constant at the maximum displacement in one direction (e.g., $-d$) while the outputs of the remaining two lanes (correctly) remain constant at the maximum displacement in the opposite direction (e.g., $+d$). Under these conditions, the resultant linear displacement $(e)$ of the arm 34 will be given by $$e = \frac{-d+d+d}{3} = +\frac{d}{3}$$

Since the correct value of the resultant linear displacement $(e)$ of the arm 34 is $+d$, it will be clear that the actual value of $(e)$ has deviated by 66⅔% from its correct value.

Should such a failure of a single lane occur in this manner, then the result may be tolerable if the apparatus of FIGURE 1 is included within a closed-loop control circuit, for, in general, the error introduced by the failure of a single lane will tend to be eventually corrected by the action of the closed-loop control circuit (the characteristics of which, however, will be modified by the effect of the failure). If, however, the apparatus of FIGURE 1 forms part of an open-loop control circuit, then the error introduced by the failure of a single lane will not tend to be corrected by an overall action.

The control apparatus of FIGURE 2 is so designed that, upon the failure of a single lane, the error in the output of the apparatus is less than is the case for the apparatus of FIGURE 1.

The apparatus of FIGURE 2 is generally similar to that of FIGURE 1, and corresponding elements have therefore been denoted by the same reference numerals. The apparatus of FIGURE 2 differs from that of FIGURE 1, in that the arm 34 is arranged to control three similar position-sensitive devices in the form of pick-offs 8, 18 and 28 which are respectively associated with the three lanes, the output of each of these pick-offs being a second electrical feedback signal which is a function of the resultant linear displacement of the arm 34. The second electrical feedback signal for the first channel is supplied to an adding device 9 wherein the signal is added to the first electrical feedback signal derived from the pick-off 7, the output of the device 9 constituting a resultant electrical feedback signal which is applied, over the line 3, to the differential device 2 wherein it is subtracted from the electrical input signal for the lane in question. Similar arrangements are made for the second and third channels. In summary, it will be clear that a second (and overall) negative-feedback circuit is provided for each of the three lanes.

In the arrangement of FIGURE 2, the pick-offs 7, 17 and 27 could be omitted if the electrical input signals to each of the three lanes were identical. If, however, the pick-offs 7, 17 and 27 were omitted, and if, also, the electrical input signals to the three lanes were not identical, then it may be shown that, although the arm 34 will continue to be displaced by an amount corresponding to the average of the electrical input signals, at least one of the lanes will tend to "run away," i.e. at least one of the arms 6, 16 and 26 will tend to take up a maximum displacement in one or the other direction: if this occurs, then the lane in question will thereafter be unable to respond correctly to changes in its electrical input signal, unless the relevant arm 6, 16 or 26 is first re-set to a position other than its maximum displacement.

The pick-offs 7, 17 and 27 are thus essential, in the apparatus of FIGURE 2. However, the first electrical feedback signals, which these pick-offs supply, are essentially feedback signals of secondary importance, the feedback signals of primary importance being constituted by the second electrical feedback signals supplied by the pick-offs 8, 18 and 28.

Thus, with the arrangement of FIGURE 2, the first electrical feedback signals should be made sufficiently large to compensate for differences which may occur between the amplitudes of the electrical input signals to the differential devices 2, 12 and 22, but should nevertheless be kept as small as possible, in order to allow the secondary electrical signals from the pick-offs 8, 18 and 28 to predominate, these latter signals having the effect of reducing the error which occurs in the output of the apparatus of FIGURE 2 when a single lane fails to operate correctly.

More specifically, if:

$x$ = the change of each of the first feedback signals (V7, V8 and V9 in FIGURE 2) for a unit change of position of the relevant one of the arms 6, 16 or 36, and $y$ = the change of each of the second feedback signals (V4, V5 and V6 in FIGURE 2) for a unit change of the resultant position of the arm 34, (where $x$ and $y$ may be measured in, for example, volts/cm. then $x$ and $y$ should be so chosen that $x$, expressed as a percentage of the resultant feedback signal $(x+y)$, should be not less than, but not very much greater than, the magnitude of the percentage "tolerance" between the electrical input signals to the differential devices 2, 12 and 22, i.e., $x$ and $y$ should be so chosen that $100x/(x+y)\%$ is not less than, but is not very much greater than, the maximum percentage difference $z$ which may occur between the amplitudes of the electrical input signals to the differential devices 2, 12 and 22.

It will thus be clear that, if the pick-offs 7, 17, 27, 8, 18 and 28 are made identical, then means must be provided to reduce the effective sensitivity of the pick-offs 7, 17 and 27 relatively to that of the pick-offs 8, 18 and 28. In FIGURE 2, this means is indicated as the similar potential dividers 10, 20 and 30, but any other similar signal-reducing means may be employed.

As will be described below, the general effect of the feedback provided by the pick-offs 8, 18 and 28, is, upon failure of operation of one of the lanes, to tend to maintain the resultant displacement of the arm 34 more nearly at the correct value (as compared with the apparatus of FIGURE 1), this being brought about by automatic off-setting (in the relatively opposite direction to the off-set of the failed lane) of the mechanical displacements of the relevant two of the arms 6, 16 and 26 of the lanes which remain in correct operation. If, however, the full range of linear displacement of each of the arms 6, 16 and 26 is from $-d$ to $+d$, where $(d)$ is a constant, and this range corresponds to the full range of variation of the electrical input signals to the differential devices 1, 11 and 21, then the "authority" of the arm 34 is limited: thus, as may be seen from the calculation carried out above, if the first lane fails with its arm 6 at the maximum displacement in one direction (e.g., $-d$), the arms 16 and 26 can only travel to their maximum displacements (e.g., $+d$) in the opposite direction in an effort to maintain the output of the apparatus, under which conditions the resultant displacement of the arm 34 will be $+d/3$ and this resultant displacement cannot be exceeded, since the arms 16 and 26 cannot move more than the distance $(d)$.

This problem of failure of "authority" can be dealt with, by increasing the permissible range of linear displacements of the arms 6, 16 and 26 sufficiently. Thus, it can be shown that if the range of the linear displacement of each of the arms 6, 16 and 26 extends from $-d$ to $+d$ for a predetermined maximum range of electrical input signals (i.e., if the displacement of each of the arms 6, 16 and 26 can be changed from $-d$ to $+d$ for the maximum possible change of the electrical input signals), but if also the arms 6, 16 and 36 are capable of being displaced over a range which extends at least from $-3d$ to $+3d$, then no such failure of "authority" occurs.

Thus, with the arangement of the preceding paragraph, if the overall range is from $-3d$ to $+3d$, and if the first lane fails to operate correctly and the position of the arm 6 remains (wrongly) constant at the maximum possible displacement (e.g., $-3d$), then the arms 16 and 36 can take up the maximum displacements in the opposite direction (e.g., $+3d$), in an attempt to compensate for the failure of the first lane. The resultant displacement of the arm 34 will then be $$\frac{-3d+3d+3d}{3} = +d$$

i.e. the arm 34 can be forced to take up a displacement $+d$, despite the failure of the first lane, i.e. the "authority" of the arm 34 is not limited as before.

It is believed that the operation of the apparatus of FIGURE 2 will be substantially clear from the above description, but certain overall points will now be mentioned.

Firstly, if the electrical input signals to each of the lanes are identical, and if each of the lanes is identically arranged, then the lanes will respond similarly, the displacements of each of the arms 6, 16 and 26 will be the same, and the resultant displacement of the arm 34 will be equal to the displacement of each of the arms 6, 16 and 26 and will be proportional to the magnitude of the electrical input signals.

Secondly, if the electrical input signals to the lanes are not identical, then the displacements ($a$, $b$, $c$, respectively) of the arms 6, 16 and 26 will be non-identical and will take up values such that the resultant displacement of the arm 34 will be proportional to the average of the magnitudes of the electrical input signals. As explained above, "run-away" of at least one of the arms 6, 16 and 36 is prevented by the action of the pick-offs 7, 17 and 27.

Thirdly, if one of the lanes fails to operate, then the effect of the pick-offs 8, 18 and 28 is to tend to maintain the resultant displacement of the arm 34 more nearly at the correct value (as compared with the apparatus of FIGURE 1), this being brought about by automatic off-setting (in the relatively opposite direction to the off-set of the failed lane) of the mechanical displacements of the relevant two of the arms 6, 16 and 26 of the lanes which remain in correct operation.

The following calculation illustrates the operation of the apparatus of FIGURE 2:

Suppose that each of the pick-offs 8, 18 and 28 produces an output of 1 volt for a resultant displacement of $+d$ of the arm 34.

Further, suppose that the "tolerance" of the electrical input signals is $\pm 4\%$. Therefore, to avoid the "run-away" discussed above, the first feedback signal from each lane must be at least 4% (and will be assumed here to be 5%) of the resultant feedback signal. Each of the pick-offs 7, 17 and 27 must therefore produce an output of 0.05 volts for a displacement of $+d$ of the relevant one of the arms 6, 16 and 26.

Thus, if all three lanes of the apparatus of FIGURE 2 are in operation with identical electrical input signals supplied to each lane, and if the output of the apparatus (the displacement of the arm 34) is $+d$, then:

(i) the second feedback signals V4, V5 and V6 will be equal, and V4=V5=V6=1 volt, and (ii) the first feedback signals V7, V8 and V9 will be equal, and $V7 = V8 = V9 = 0.05$ volts, and (iii) hence, if the gains of the amplifiers 4, 14 and 24 are relatively high, such that the outputs of the differential devices 2, 12 and 22 are negligibly small, then, for each lane, the electrical input signal (V1, V2 or V3) can be taken to be equal and opposite to the resultant feedback signal, i.e. $V1 = V2 = V3 = -1.05$ volts.

Suppose now that the maximum possible displacements of the arms 6, 16 and 26 are $\pm 3d$, as discussed above, and that, when the output of the apparatus (the displacement of the arm 34) ought to be $+d$ (corresponding to electrical input signals of $-1.05$ volts, as just calculated), the first channel fails to operate and the arm 6 takes up "worst possible displacement" of $(-3d)$. The apparatus of FIGURE 2 will then move to an equilibrium state wherein the displacements of the arms 16 and 26 are equal and are $d'$, while the resultant displacement of the arm 34 will be $d''$, where:

$$d'' = \frac{2d' - 3d}{3} \quad (1)$$

Since, despite the failure of the first lane, the electrical input signals to the lanes are assumed to remain constant at $-1.05$ volts, it must be true that $$(V5+V8) = (V6+V9) = +1.05 \text{ volts}$$

But $$V5 = \frac{d''}{d} \times 1 \text{ volt}$$

and $$V8 = \frac{d'}{d} \times 0.05 \text{ volt}$$

Hence, $$d'' + 0.05d' = 1.05d \quad (2)$$

Solving Equations 1 and 2, we find that $$d' = 2.87d \quad (3)$$

and $$d'' = 0.913d \quad (4)$$

Thus, despite the failure of the first lane, the arm 6 having taken up a displacement of $(-3d)$, the resultant displacement of the arm 34 has only been reduced from $d$ to $0.913d$, i.e. by 8.7% (as compared with 66⅔% in the case of the apparatus of FIGURE 1). This effect is obtained by the action of the remaining two channels, the arms 16 and 26 having been automatically moved from their nominal displacements of $(+d)$ to displacements of $+2.87d$, this tending to compensate for the failure of the first channel.

It will thus be understood that the operation of the apparatus of FIGURE 2 tends to be self-corrective, upon the failure of a single lane.

DETAILS OF APPARATUS OF FIGURE 2

The linear actuators 5, 15 and 25 may each comprise an electric motor arranged to drive a "lead-screw" or may each comprise an electric motor arranged to drive the pinion of a rack-and-pinion device, but any other suitable arrangement may be employed.

The pick-offs 7, 17, 27, 8, 18 and 28 may be rotary pick-offs: where the lead screws of the preceding paragraphs are employed, the rotary pick-offs may be driven, via suitable gear wheels, from the lead-screws.

Alternatively, the pick-offs 7, 17, 27, 8, 18 and 28 may be in the form of differential transformers of the linear and variable type, the input of each such transformer being a linear displacement applied to an input plunger.

MODIFICATIONS OF APPARATUS OF FIGURE 2

In one modification of the apparatus of FIGURE 2, only one transducer (for example, the transducer 1) is provided, and the output of that transducer constitutes a single electrical input signal which is supplied to each of the differential devices 2, 12 and 22. The arrangement of FIGURE 2 is, however, preferred.

In another modification of the apparatus of FIGURE 2, only one of the pick-offs 8, 18 and 28 is provided, and the output of that pick-off constitutes a single second feedback signal which is supplied to each of the adding devices 9, 19 and 29. The arrangement of FIGURE 2 is, however, preferred.

In a further modification of the apparatus of FIGURE 2, as applied to the first lane, the adding device 9 is combined with the differential device 2: similar combinations may be made for the remaining lanes.

In another modification of the apparatus of FIGURE 2, the linear actuators 5, 15 and 25 are replaced by rotary actuators: each such rotary actuator provides a mechanical output signal in the form of a rotary displacement which is a function of the output signal of the relevant one of the differential devices 2, 12 and 22. In this case, the averaging mechanism must have a form different from that shown in FIGURE 2 and is arranged to generate a resultant rotary displacement which is equal to the average of the individual rotary displacements of the rotary actuators. In addition, the outputs of the pick-offs 7, 17, 27, 8, 18 and 28 are in this case dependent upon the relevant rotary displacements. The rotary actuators may comprise electric motors arranged to drive epicyclic-type rotary gear-boxes used as differentials, but any other suitable arrangement may be used.

Finally, it is to be understood that the apparatus of FIGURE 2 may be modified by providing more than three (but not less than three) of the lanes. In such case, a suitably modified form of averaging mechanism will be required, but the apparatus is otherwise similar to that of FIGURE 2. It will be recalled that, in the case of the three-lane apparatus of FIGURE 2, failure of "authority" of the arm 34 (upon failure of one of the three lanes) can be prevented, by making the arms 6, 16 and 26 capable of being displaced over a range which extends at least from $-3d$ to $+3d$, where the normal working range of those arms extends from $-d$ to $+d$. In the general case, where the number of lanes employed is $m$, it may be shown that failure of "authority" of the arm 34 (upon failure of one of the lanes) can be prevented, by making the arms 6, 16, 26, . . . capable of being displaced over a range which extends at least from $-md/(m-2)$, to $+md/(m-2)$, where, again, the normal working range of those arms extends from $-d$ to $+d$. It should be noted that similar considerations apply to the case where rotary actuators are employed, instead of the linear actuators 5, 15 and 25.

The embodiments of the invention to which an exclusive property or privilege is claimed are defined as follows:

1. Multiplex type control apparatus which includes at least three lanes, each lane including a differential device having an input connected to receive an electrical input signal representing the magnitude of at least one variable quantity, and an output connected to an amplifier whose output is connected to an electro-mechanical converter, the amplifier having a sufficiently high gain that the mechanical output signal from the electro-mechanical converter is a substantially linear function of the input signal to the differential device, and a first position sensitive device coupled to the output of the electro-mechanical converter; the electro-mechanical converters of the lanes being arranged in parallel and having outputs connected to a mechanical averaging mechanism, position sensitive means coupled to the output of the mechanical averaging mechanism, and for each lane feedback means connecting the output of the position sensitive means and the output of the first position sensitive device of the associated lane to the input of the differential device of that associated lane to provide a resultant electrical feed-back signal for that lane.

2. Apparatus according to claim 1, wherein the rate of change of each of the output signals of the first position sensitive devices per unit change of the corresponding mechanical output signal is $x$ (e.g. in volts/cm.), the rate of change of the output signal of the position sensitive means per unit change of the resultant mechanical output signal is $y$ (e.g. in volts/cm.), and $x$ and $y$ are so chosen that $100x/(x+y)\%$ is not less than the maximum percentage difference $z$, due to working tolerances, which may occur between the amplitudes of the nominally identical electrical input signals to the differential devices of the lanes.

3. Apparatus according to claim 2, wherein $x$ and $y$ are so chosen that $100x/(x+y)$ is greater than $z$.

4. Apparatus according to claim 3, wherein $x$ and $y$ are so chosen that $100x/(x+y)$ is only a relatively small amount greater than $z$.

5. Apparatus according to claim 1, wherein, for each lane, the normal range of variation of the corresponding mechanical output signal for a predetermined maximum range of the electrical input signal extends from $-d$ to $+d$, where $d$ is a constant, but the permissible range of variation of the mechanical output signal extends at least from $-md/(m-2)$ to $+md/(m-2)$, where $m$ is the number of lanes employed.

6. Apparatus according to claim 5, wherein there are three lanes, and the permissible range of variation of the mechanical output signal of each lane extends at least from $-3d$ to $+3d$.

7. Apparatus according to claim 6, wherein the said permissible range of variation extends exactly from $+3d$ to $-3d$.

8. Apparatus according to claim 1, wherein the position-sensitive means comprises a separate additional position-sensitive device for each lane.

9. Apparatus according to claim 8, wherein the first position-sensitive devices and the additional position-sensitive devices are all substantial identical, and each lane includes a separate signal-producing means located between the corresponding first position-sensitive device and the corresponding differential device.

10. Apparatus according to claim 9, wherein each signal-reducing means comprises a potential divider.

11. Apparatus according to claim 1, wherein each lane includes a separate transducer responsive to the magnitude of the said variable quantity or quantities and arranged to generate the electrical input signal for that lane.

12. Apparatus according to claim 1, wherein the electromechanical converters are linear actuators.

13. Apparatus according to claim 1, wherein the electromechanical converters are rotary actuators.

References Cited

UNITED STATES PATENTS

| | | | |
|---|---|---|---|
| 3,054,039 | 9/1962 | Meredith | 318—19 XR |
| 3,071,336 | 1/1963 | Fearnside | 318—489 XR |
| 3,190,586 | 6/1965 | Righton | 318—28 XR |
| 3,219,295 | 11/1965 | Hastings | 318—489 XR |
| 3,269,676 | 8/1966 | Hopkins | 318—18 XR |
| 3,309,588 | 3/1967 | Martin et al. | 318—19 |

B. DOBECK, Primary Examiner